(12) United States Patent
Khor et al.

(10) Patent No.: US 10,011,090 B1
(45) Date of Patent: Jul. 3, 2018

(54) PLANAR PRESSING FOR MANUFACTURE OF DISPLAYS

(71) Applicant: Amazon Technologies, Inc., Reno, NV (US)

(72) Inventors: Chin Siong Khor, Singapore (SG); Robert Zenner, San Jose, CA (US); Anoop Menon, Capitola, CA (US)

(73) Assignee: Amazon Technologies, Inc., Reno, NV (US)

( * ) Notice: Subject to any disclaimer, the term of this patent is extended or adjusted under 35 U.S.C. 154(b) by 828 days.

(21) Appl. No.: 14/318,290

(22) Filed: Jun. 27, 2014

(51) Int. Cl.
*B32B 7/12* (2006.01)
*B32B 37/14* (2006.01)
*C03C 17/00* (2006.01)
*B32B 17/06* (2006.01)

(52) U.S. Cl.
CPC ........... *B32B 7/12* (2013.01); *B32B 17/06* (2013.01); *B32B 37/14* (2013.01); *C03C 17/00* (2013.01)

(58) Field of Classification Search
CPC .... B32B 7/00; B32B 7/10; B32B 7/12; B32B 17/00; B32B 17/06; B32B 37/00; B32B 37/10; B32B 37/14; C03C 17/00
See application file for complete search history.

(56) References Cited

U.S. PATENT DOCUMENTS

| | | | |
|---|---|---|---|
| 8,580,367 B2 * | 11/2013 | Satake | B32B 3/02 428/122 |
| 2006/0108050 A1 * | 5/2006 | Satake | B32B 3/02 156/101 |
| 2007/0273806 A1 * | 11/2007 | Lin | G02F 1/133308 349/58 |
| 2009/0029100 A1 * | 1/2009 | Wigdorski | B29C 66/342 428/98 |
| 2013/0000822 A1 * | 1/2013 | Kim | B32B 17/10816 156/99 |
| 2014/0002975 A1 * | 1/2014 | Lee | H05K 5/0017 361/679.01 |

* cited by examiner

*Primary Examiner* — Jacob T Minskey
*Assistant Examiner* — Matthew Hoover
(74) *Attorney, Agent, or Firm* — Lowenstein Sandler LLP

(57) ABSTRACT

Systems and methods for planar pressing a module are described. A module includes a first layer and a second layer coupled together by an adhesive between the first layer and second layer. The module is disposed on a planar press and the planar press is activated to apply directional pressure and heat to the module for a specified period of time.

19 Claims, 11 Drawing Sheets

PLANAR PRESSING FOR MANUFACTURE OF DISPLAYS

BACKGROUND

An electronic device, such as a tablet or an electronic book reader, may include a number of layers. The layers may include, for example, a back plate, a display, a touch sensor, cover glass, or any other layer. The layers may be coupled together by an adhesive sandwiched between the layers. The adhesive may be an optically clear adhesive. For example, a cover layer may be coupled to an underlying display layer by an optically clear adhesive such that viewing of the display by a user of the electronic device is not disturbed by the adhesive.

During manufacture of the electronic device, care may be taken to ensure that application of the adhesive between two layers is uniform. Deviations from a uniform application of the adhesive (such as bubbles in the adhesive, delamination of the adhesive, or other defects) may be visible to a user of the electronic device and disturb the viewing of the display by the user.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only. Further, it should be understood that the drawings are not necessarily proportional or to scale.

DETAILED DESCRIPTION

Figure 1A:
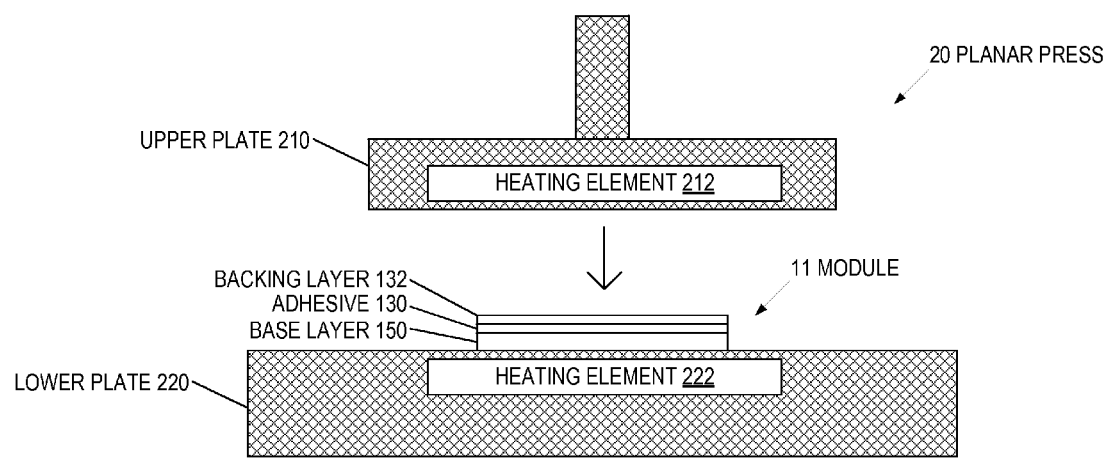
FIG. 1A is a side view of a single-layer module on a planar press according to one embodiment.

An electronic device, such as a tablet or an electronic book reader, may include a display stack or other module having a number of layers that are bonded by an optically clear adhesive. The layers in the display stack may include, for example, a back plate, a display, a touch sensor, cover glass, or any other layer. During manufacture of the electronic device, care may be taken to ensure that application of the adhesive between two layers of the display stack or other module is uniform. Deviations from a uniform application of the adhesive (such as bubbles in the adhesive, delamination of the adhesive, or other defects or non-uniformities) may be visible to a user of the electronic device and disturb the viewing of a display by the user. In one embodiment, a planar press is used to apply pressure and heat to the display stack or other module to remove any residual defects at the interface between two layers. A compressive foam and/or gel may be disposed around a perimeter of the display stack during application of the planar press to apply a uniform force around the perimeter. By removing defects from the display stack, the viewing experience of a user of the electronic device including the display stack may be improved.

A number of processes may be performed during manufacture of an electronic device to achieve a uniform application of an adhesive upon a layer or between two layers of the electronic device (e.g., between two layer of a display stack of the electronic device). The processes may remove defects in the adhesive and defects at an interface between layers and/or prevent defects from forming during use of the electronic device by a user. The processes may include one or more of roll lamination, vacuum lamination, autoclaving, planar pressing, or any other manufacturing process.

In one embodiment, roll lamination may be used to apply an adhesive film on a layer of the electronic device. The adhesive film may be a flexible film of adhesive between two removable non-adhesive layers. A roll laminating machine removes one of the non-adhesive layers from the adhesive film and applies the flexible film of adhesive to a first layer of the electronic device by rolling across the first layer of the electronic device and applying the film of adhesive along the way.

The other non-adhesive layer of the adhesive film may be removed and a second layer applied. The second layer may be applied using any of a number of techniques, including roll lamination or vacuum lamination. In one embodiment, the second layer is flexible and roll lamination is used to apply the second layer. In another embodiment, the second layer is rigid and vacuum lamination is used to apply the second layer.

As used herein, a module includes a layer of an electronic device with an adhesive applied on at least one side of the layer and may include two or more layers of an electronic device with adhesive between them. For example, a module may include more than two layers with multiple portions of adhesive between adjacent layers. A module may be included in a completely manufactured electronic device. In one embodiment, the module is a display stack that includes two or more layers. For example, the display stack may include a back plate, a display, a touch sensor, and a cover glass. The display stack may be operatively connected to a processing device or a display driver to receive image data and display an image corresponding to the image data. The display stack may also sense touch inputs from a user and communicate the input to the processing device.

In one embodiment, vacuum lamination includes subjecting a module of the electronic device to decreased ambient pressure (as compared to a standard pressure of approximately one atmosphere) for a length of time. In one embodiment, the decreased ambient pressure results in a vacuum. Vacuum lamination may also include subjecting the module to heat. For example, the module may be placed in a vacuum chamber for between one and thirty seconds in which the temperature is between 25 and 50° C. and the ambient pressure is between 0.1 and 3.0 kilopascals (kPa). Thus, vacuum lamination may be used to create a module with two layers and an adhesive between the layers by eliminating air that can otherwise become trapped within the interfaces between the layers and adhesive.

In one embodiment, autoclaving includes subjecting a module to increased ambient pressure (as compared to a standard pressure of approximately one atmosphere) for a length of time. Autoclaving may also include subjecting the module to heat. For example, the module may be placed in an autoclave chamber for between 15 and 45 minutes in which the temperature is between 35 and 65° C. and the ambient pressure is between 300 and 600 kPa. Thus, autoclaving may be used to create a module with two layers and an adhesive between the layers in which the heat softens the adhesive, making it more compliant and more tacky and in which the increased air pressure applies hydrostatic compression to uniformly remove defects in the adhesive.

In one embodiment, planar pressing includes pressing a module between two plates of a planar press for a period of time. Planar pressing may also include subjecting the module to heat during the planar pressing.

FIG. 1A is a side view of a single-layer module 11 on a planar press 20. The module 11 includes a base layer 150 with an adhesive 130 applied on one side of the base layer 150. The adhesive 130 is adhered to the base layer 150 on one side and to a non-adhesive backing layer 132 on the other side. The base layer 150 may be a transparent layer (e.g., plastic or glass). The adhesive 130 may be an optically clear adhesive (OCA). The non-adhesive backing layer 132 may be a release film which is to be removed during manufacture of an electronic device including the module 10. Accordingly, any defects in the adhesive or the interface between the base layer 150 and the adhesive 130 may be visible to a user of an electronic device including the module. In one embodiment, the adhesive 130 is applied by roll lamination. In other embodiments, the base layer 150 may not be intended for a display (e.g., may not be transparent). In such an embodiment, the adhesive may be an optically opaque adhesive.

The planar press 20 includes an upper plate 210 and a lower plate 220. Each of the upper plate 210 and lower plate 220 may include a substantially flat surface for applying a uniform pressure over the area of the surface. Thus, in operation, the upper plate 210 of the planar press 20 moves towards the lower plate 220 and squeezes the module 11 between the upper plate 210 and lower plate 220. Thus, the planar press 20 applies directional pressure (as opposed to ambient pressure) to the module 11. Whereas ambient pressure may be uniformly applied in all directions of a three-dimensional space, directional pressure is non-uniformly applied.

The planar press may also include one or more heating elements 212, 222 that heat the upper plate 210 and/or lower plate 220 of the planar press 20 during operation. Thus, the planar press 20 may apply heat to the module 11. The application of pressure and heat to the module may increase the uniformity of the adhesive applied to the base layer 150. In particular, the application of pressure and heat may remove defects in the adhesive and/or prevent defects from forming during use by a user of an electronic device including the module. For example, the application of heat may cause the adhesive to become softer, tackier, and more compliant and allow it to more easily deform locally over and around topographical features of the base layer 150. The application of pressure may induce such deformations over and around the topographical features to increase the uniformity of the adhesive.

Figure 1B:
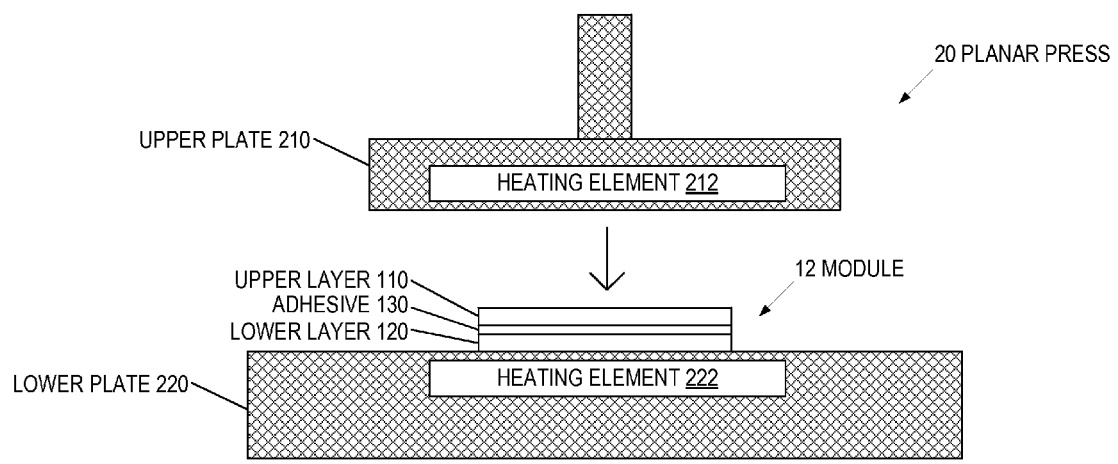
FIG. 1B is a side view of a two-layer module on a planar press according to one embodiment.

FIG. 1B is a side view of a two-layer module 12 on a planar press 20. The module 12 includes an upper layer 110 and a lower layer 120 with an adhesive 130 between the two layers. The module 12 of FIG. 1B may be formed by removing the non-adhesive backing layer 132 from the module 11 of FIG. 1A and applying a second layer to the module 11.

The adhesive 130 is adhered to the upper layer 110 on one side and to the lower layer 120 on the other side. Either or both of the upper layer 110 and lower layer 120 may be a transparent layer (e.g., plastic or glass). As noted above, the adhesive 130 may be an optically clear adhesive (OCA). Accordingly, any defects in the adhesive or the interface between the adhesive 130 and the upper layer 110 or lower layer 120 may be visible to a user of an electronic device including the module 12.

As described above, the planar press 20 includes an upper plate 210 and a lower plate 220 and associated heating elements 212, 222. In operation, the upper plate 210 of the planar press 20 moves towards the lower plate 220 and squeezes the module 12 between the upper plate 210 and lower plate 220, applying a directional pressure to the module 12. The application of pressure and heat to the module 12 may increase the uniformity of the adhesive between the upper layer 110 and lower layer 120. In particular, the application of pressure and heat may remove defects in the adhesive and/or prevent defects from forming during use by a user of an electronic device including the module. For example, the application of heat may cause the adhesive to become softer, tackier, and more compliant and allow it to more easily deform locally over and around topographical features of the upper layer 110 or lower layer 120. The application of pressure may induce such deformations over and around the topographical features.

Figure 1C:
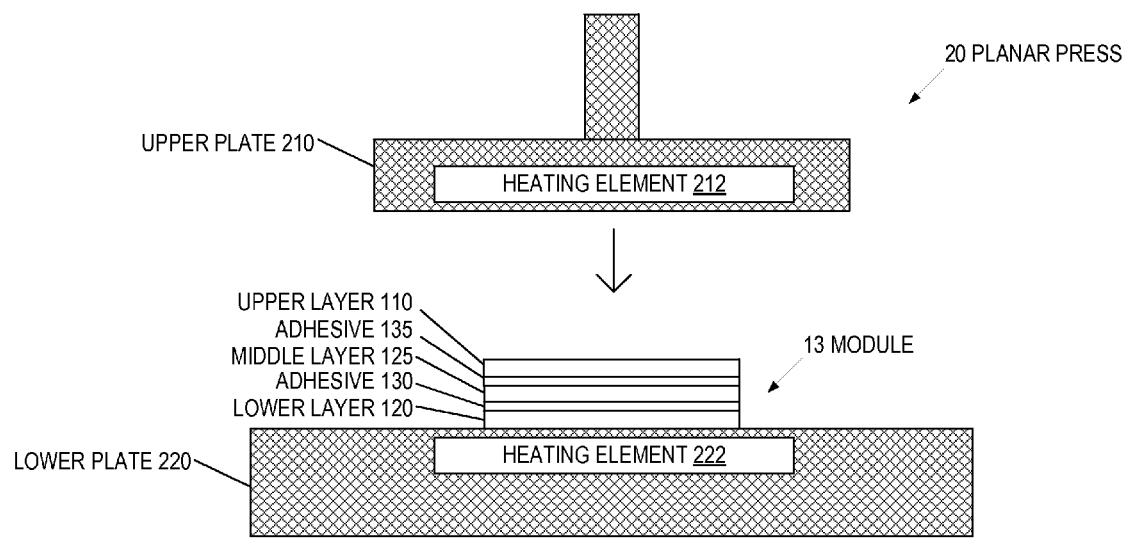
FIG. 1C is a side view of a three-layer module on a planar press according to one embodiment.

FIG. 1C is a side view of a three-layer module 13 on a planar press 20. The module 13 includes an upper layer 110, a lower layer 120, and a middle layer 125. The module further includes an adhesive 130 between the lower layer 130 and the middle layer 125 and additional adhesive 135 between the upper layer 110 and the middle layer 125. The module 13 of FIG. 1C may be formed, for example, by roll laminating the additional adhesive 135 upon the module 12 of FIG. 1B, removing a non-adhesive backing layer from the additional adhesive 135 and applying a third layer to the module 12.

The adhesive 130 is adhered to the lower layer 120 on one side and to the middle layer 125 on the other side. Similarly, the additional adhesive 135 is adhered to the upper layer 120 on one side and to the middle layer 125 on the other side. One or more of the upper layer 110, lower layer 120 and middle layer 125 may be a transparent layer (e.g., plastic or glass). Either or both of the adhesive 130 or the additional adhesive 135 may be an optically clear adhesive (OCA). Accordingly, any defects in the adhesive or additional adhesive or in the interfaces between the adhesives and the layers may be visible to a user of an electronic device including the module 13.

As described above, the planar press 20 includes an upper plate 210 and a lower plate 220 and associated heating elements 212, 222. In operation, the upper plate 210 of the planar press 20 moves towards the lower plate 220 and squeezes the module 13 between the upper plate 210 and lower plate 220, applying a directional pressure to the module 13. The application of pressure and heat to the module 12 may increase the uniformity of the adhesives between the layers by removing non-uniformities of the adhesives between the layers. In particular, the application of pressure and heat may remove defects in the adhesives and/or prevent defects from forming during use by a user of an electronic device including the module.

In one embodiment, the lower layer 120 is a back plate, the middle layer 125 is a display layer or a touch sensor layer, and the upper layer 110 is cover glass. In other embodiments, the layers may be other components of a display stack.

Figure 2:
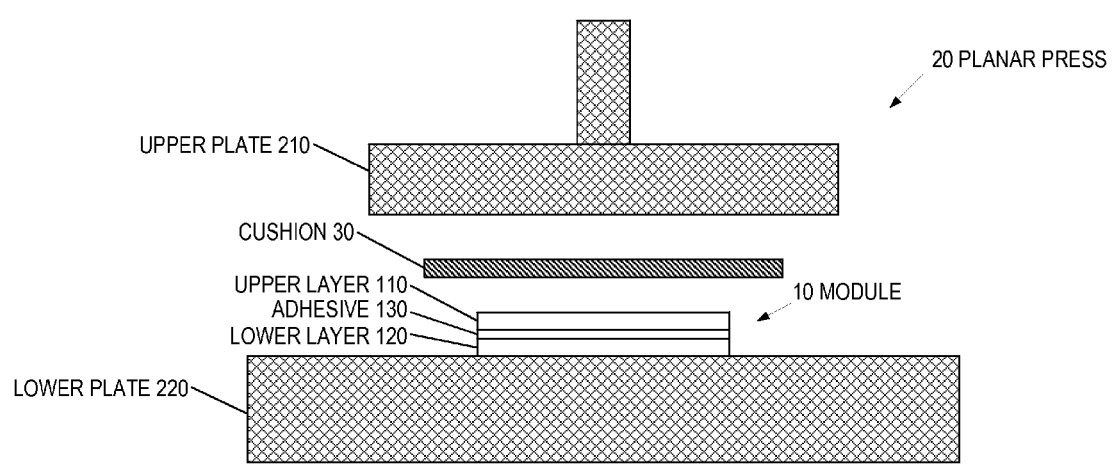
FIG. 2 is a side view of a module on a planar press with a cushion.

FIG. 2 is a side view of a module 10 and a planar press 20 with a cushion 30. Although FIG. 2 illustrates a module 10 with two layers, it is to be appreciated that a single-layer module, a three-layer module, or a module with any number of layers may be used. In one embodiment, a cushion 30 is used during planar pressing. The cushion 30 may be a compressible layer at least partially disposed between the module 10 and a portion of the planar press 20. In one embodiment, the cushion 30 is a rubber sheet, a compressive foam sheet, or another compressive material. In one embodiment, a rubber sheet is approximately one millimeter thick. The cushion 30 may be disposed between the module 10 and the upper plate 210 of the planar press 20. In another embodiment, the cushion 30 may be disposed between the module 10 and the lower plate 210 of the planar press 20. In one embodiment, two cushions may be used, one between the upper plate 210 and the module 10 and another between the lower plate 220 and the module 10.

The cushion 30 may serve a number of different functions. In one embodiment, the cushion evenly distributes force applied by the planar press across the entire surface of the module (e.g., the upper layer 110). In another embodiment, the cushion 30 serves to distribute the pressure applied by the planar press to a specific portion of the module. For example, in one embodiment, the cushion 30 evenly distributes force to a perimeter of the module (e.g., a perimeter of the upper layer 110 and lower layer 120).

In one embodiment, the module 10 is placed on the lower plate 220 of the planar press, the cushion 30 is placed over the module 10, and the planar press 20 is activated, applying pressure (and, optionally, heat) to the module 10.

Figure 3:
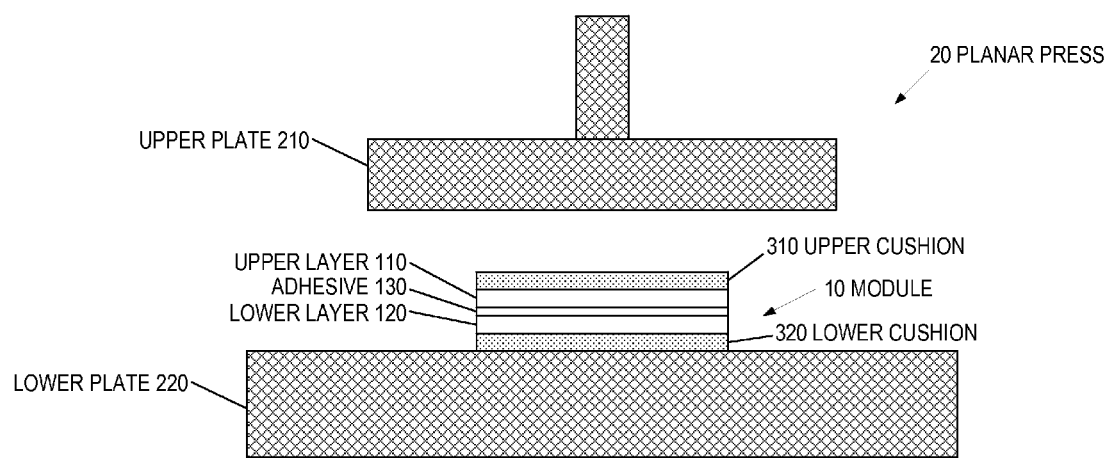
FIG. 3 is a side view of a module on a planar press with two cushions.

FIG. 3 is a side view of a module 10 and a planar press 20 with two cushions 310, 320. Although FIG. 3 illustrates a module 10 with two layers, it is to be appreciated that a single-layer module, a three-layer module, or a module any number of layers may be used. During planar pressing, an upper cushion 310 is disposed between the module 10 and the upper plate 210 of the planar press 20 and a lower cushion 320 is disposed between the module 10 and the lower plate 220 of the planar press 20.

The upper cushion 310 and lower cushion 320 may be made of compressible foam. The upper cushion 310 and lower cushion 320 may be applied to the module 10 before the module is placed on the planar press 20. For example, in one embodiment, the upper cushion 310 and lower cushion 320 may include an easily removable (e.g., low tack) adhesive backing or gel. The adhesive backing or gel may be thermally stable. The upper cushion 310 and lower cushion 320 may be peeled off of a protective film and applied to the module 10. Then, the module 10 (with the upper cushion 310 and lower cushion 320 attached) may be placed on the lower plate 220 of the planar press 20. The planar press 20 may then be activated, which causes the planar press 20 to apply pressure (and, optionally, heat) to the module 10. Then, the module 10 may be removed from the planar press 20, and the upper cushion 310 and lower cushion 320 may be removed from the module 10.

In one embodiment, a cushion (e.g., the cushion 30 of FIG. 2 or the upper cushion 310 or lower cushion 320 of FIG. 3) is disposed uniformly between the module 10 and the planar press 20. In another embodiment, the cushion is placed between only a portion of the module 10 and the planar press 20. In particular, the cushion 30 may be disposed between the module 10 and the planar press around an edge or perimeter of the module 10 including four edges of the module (a top edge, a bottom edge, a left edge, and a right edge), but may not be present near a center of the module 10. By disposing the cushion 30 around an edge or perimeter of the module 10, pressure is mainly applied to the portion where defects may be more likely to form. In other embodiments, the cushion 30 may be shaped differently to remove or prevent defects from another portion of the module where defects may be likely to form.

In one embodiment, the cushion 30 is fully compressed such that pressure is applied to the entire module 10. The pressure may be non-uniform pressure. For example, greater pressure may be applied around the perimeter due to the cushion 30. In another embodiment, the cushion 30 is not fully compressed. In such an embodiment, a center portion of the module 10 may not receive pressure.

Though FIGS. 2 and 3 are shown with a module including only two layers, as mentioned above, embodiments of the invention may include pressing more than two layers. For example, a stack of three layers may be formed as shown in FIG. 1C, with a first adhesive layer bonding a first layer to a second layer and a second adhesive layer bonding the second layer to a third layer. If more than two layers are bonded together, the planar pressing may be performed once after all of the layers have been combined. Alternatively, the planar pressing may be performed multiple times. For example, the planar pressing may be performed after the first and second layers are bonded, and again after the second and third layers are bonded.

Figure 4:
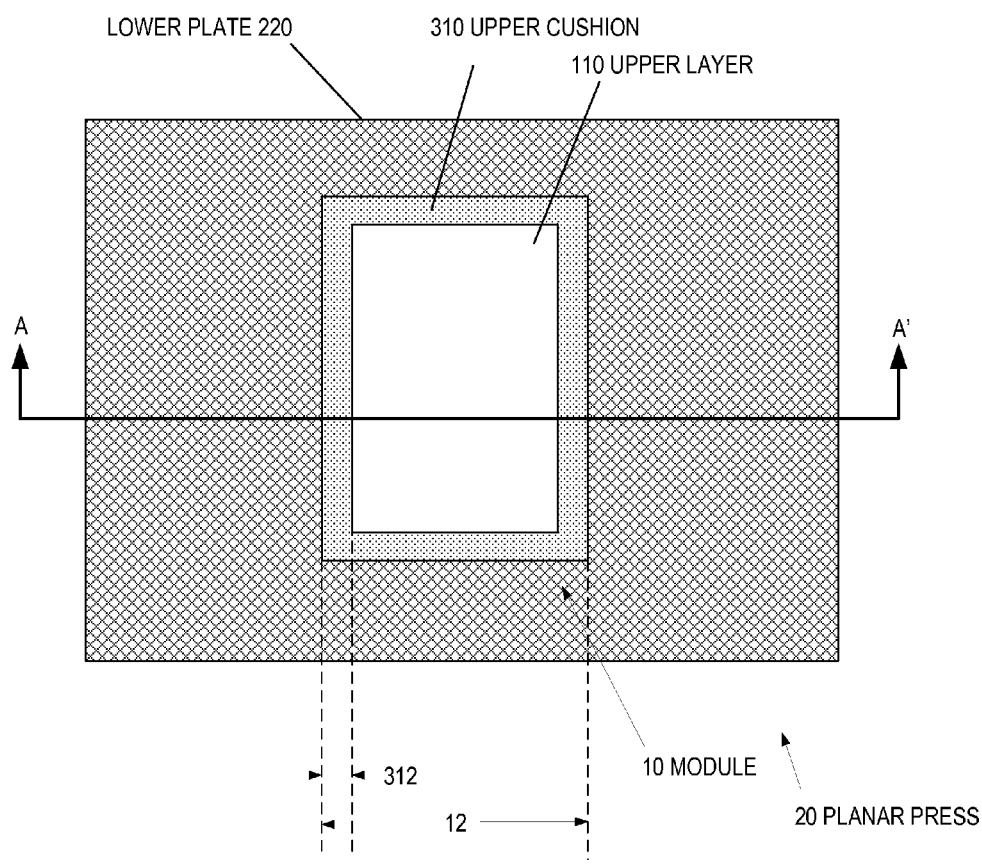
FIG. 4 is a top view of a module on a planar press.

FIG. 4 is a top view of a module 10 on a planar press 20. The module 10 is disposed on the lower plate 220 of the planar press. Although not visible from the top view of FIG. 4, there may be a lower cushion between the module 10 and the lower plate 220. An upper cushion 310 is disposed on top of the module 10. The upper cushion 310 is a frame-shaped element (referred to as a framing cushion) that covers an edge or perimeter of the upper layer 110 of the module 10. In one embodiment, the framing cushion extends beyond the module 10, having a size slightly greater than the size of the module 10, to ensure that pressure is applied at the edge of the module 10. For example, the framing cushion may be placed to overlap the four edges of the upper layer or lower layer. In another embodiment, the framing cushion has a size slightly less than the size of the module 10 to ensure that bubbles can escape from between the layers of the module 10.

In one embodiment, the width 312 of the upper cushion 310 is between approximately one and two centimeters. In another embodiment, the width 312 of the upper cushion 310 is between approximately five and ten percent the width 12 of the module 10. The size and shape of the upper cushion 310 and lower cushion 320 may correspond to where defects are more likely to form. Thus, in some embodiments, where defects have been found to form more often around a perimeter of the module 10, a framing cushion may remove or prevent such defects.

Figure 4A:
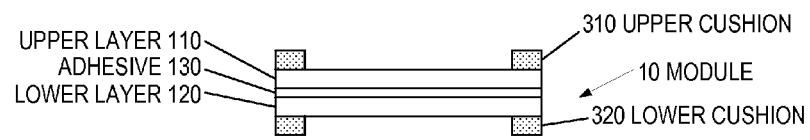
FIG. 4A is a cross-sectional view of the module of FIG. 4.

FIG. 4A is a cross-sectional view of the module 10 of FIG. 4. As shown in the cross-section, the upper cushion 310 is a frame-shaped element that covers an edge or perimeter of the upper layer 110 of the module 10. Similarly, a lower cushion 320 covers an edge or perimeter of a lower layer 120 of the module. Between the upper layer 110 and lower layer 120, the module includes an adhesive 130. In other embodiments, there may be additional layers and/or additional adhesives between the upper layer 110 and lower layer 120.

Figure 5:
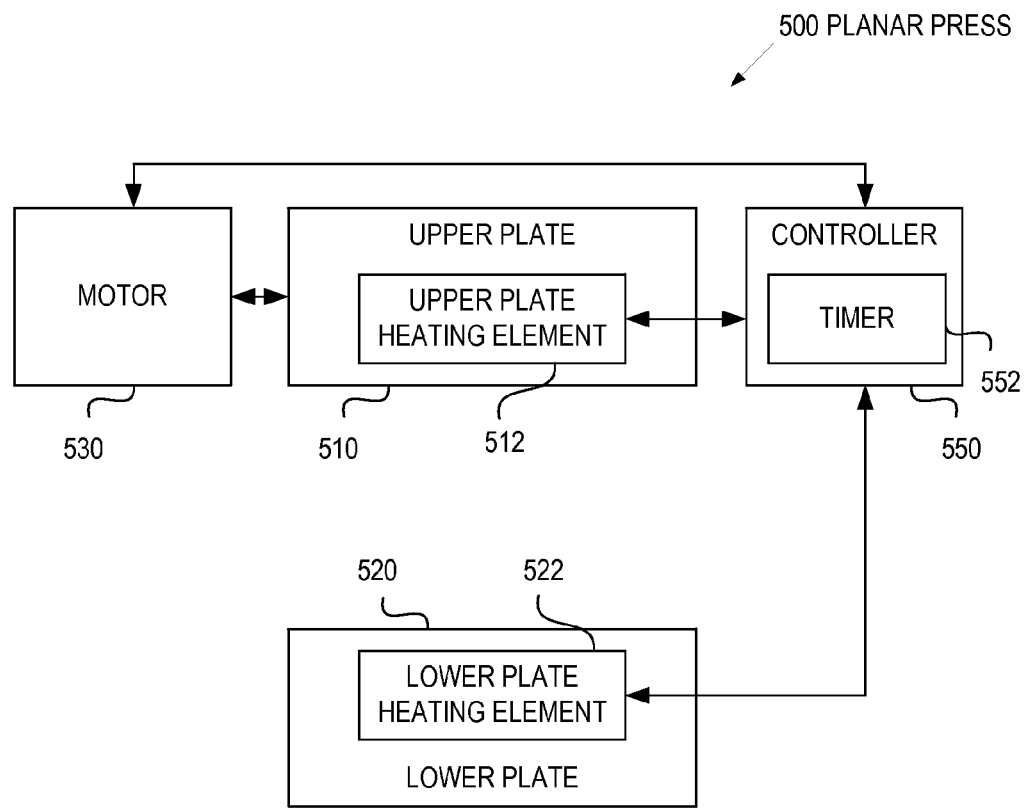
FIG. 5 is a functional block diagram of a planar press according to one embodiment.

FIG. 5 is a functional block diagram of a planar press 500 according to one embodiment. The planar press 500 includes an upper plate 510 and a lower plate 520. The upper plate 510 includes an upper plate heating element 512 and the lower plate 520 includes a lower plate heating element 522.

The planar press 500 includes a motor 530 that moves the upper plate 510 with respect to the lower plate 520. In one embodiment, the lower plate 520 is fixed and the motor 530 moves the upper plate 510 towards the lower plate 520. In another embodiment, the motor 530 moves both the upper plate 510 and the lower plate 520 towards each other. In one embodiment, the motor 530 is an electric motor that moves the upper plate 510 towards the lower plate 520. In another embodiment, the motor 530 is a pneumatic motor that moves the upper plate 510 towards the lower plate 520 by inflating a bladder above the upper plate 510. The motor 530 may be any device that moves the upper plate 510 towards the lower plate 520.

The planar press 500 includes a controller 550 that controls the motor 530 and the heating elements 512, 522. The controller 550 may be one or more processing devices and may include or be coupled to an interface that allows a user to use the controller 550 to control the planar press 500.

The controller 550 may control the motor 530 to change the position of the upper plate 510 with respect to the lower plate 520 or to apply a force (or pressure) between the two plates. The controller 550 may receive feedback information from motor 530 regarding the positions of the upper plate 510 with respect to the lower plate 520 or with respect to the force (or pressure) applied between the two plates 510, 520.

The controller 530 may control the heating elements 512, 522 to change the temperature of the upper plate 510 and the lower plate 520. The controller 550 may receive feedback information from the heating elements 512, 522 regarding the temperature of the two plates 510, 512.

The controller 530 may include a timer 552 to determine a length of time that pressure and/or heat are applied by the upper plate 510 and the lower plate 520.

Figure 6:
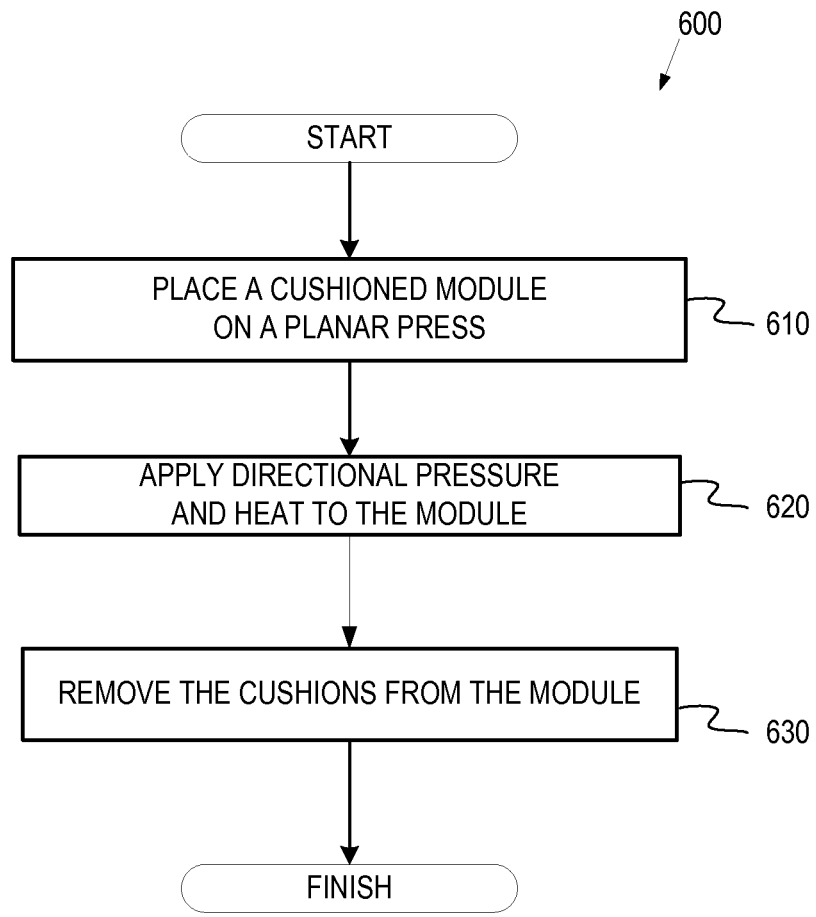
FIG. 6 illustrates a flowchart of an embodiment of a method of removing one or more defects from a module.

FIG. 6 illustrates a flowchart of an embodiment of a method 600 of removing one or more defects from a module. The method 600 may be at least partially performed by processing logic that may include hardware (e.g., circuitry, dedicated logic, programmable logic, microcode, etc.), software (e.g., instructions executed by a processing device), firmware or a combination thereof. For example, the method 600 may be at least partially performed by a programmable logic controller (PLC) or other processing device (e.g., controller 550) that controls the planar press 500 of FIG. 5.

At block 610, a cushioned module is placed on a planar press. In one embodiment, the module is a multi-layer stack such as a display stack. A display stack may be a multi-layer stack that includes some or all of a display layer (e.g., a liquid crystal display (LCD), electronic ink (e-ink) display, or organic light emitting diode (OLED) display), a touch sensor layer, a light guide layer and one or more clear protective layers (e.g., glass layers) arranged in a stack. The module may include a first layer and a second layer with an adhesive disposed between the first layer and the second layer. The adhesive may be an optically clear adhesive that bonds the first layer to the second layer. The module is cushioned by the application of a first framing cushion on the first layer and a second framing cushion on the second layer. The framing cushions, as described above, may be disposed on four edges of the first layer and second layer. The module may be placed on the planar press between an upper plate and a lower plate of the planar press.

At block 620, directional pressure and heat are applied to the cushioned module by the planar press for a period of time. In one embodiment, the planar press applies a pressure between approximately 0.05 and 0.30 megapascals (MPa). For example, in one embodiment, the planar press applies a pressure of approximately 0.10 MPa. In one embodiment, the planar press applies a pressure between approximately 0.10 and 0.30 megapascals (MPa). The directional pressure may be applied, for example, by moving the upper plate of the planar press towards the lower plate of the planar press. The heat may be applied by heating one or both of the upper plate and/or lower plate.

In one embodiment, the planar press applies a temperature of between approximately 30 and 70 degrees Celsius (° C.). For example, in one embodiment, the planar press applies a temperature of approximately 70° C. In one embodiment, the planar press applies a temperature of between approximately 60 and 80° C. The application of heat to the module may make the adhesive flow more easily, making removal of defects easier.

In one embodiment, the planar press applies the directional pressure and heat for between approximately two and ten minutes. In another embodiment, the planar press applies the directional pressure and heat for between approximately ten and twenty minutes. For example, in one embodiment, the planar press applies the directional pressure and heat for approximately fifteen minutes. As a result of the pressing, defects in the module may be removed or prevented. For example, the pressing may squeeze out bubbles that have formed in the adhesive removing such bubbles from the module. As another example, the pressing may make the adhesion of the adhesive between the two layers more uniform, minimizing later delamination. Thus, the application of directional pressure and heat to the module may remove one or more defects of the module, such as a bubble, a delamination, or non-uniformity.

At block 630, the cushioned are removed from the module. In some embodiment, the module can be incorporated into electronic device, such as a tablet, mobile phone, laptop computer, or an electronic book reader. Electrical connections may be made between the display stack and other components of the electronic device, such as a processing device, a battery, a logic board, and so forth.

Although the method 600 is described above for a single module, it is to be appreciated that multiple modules may be processed together (e.g., simultaneously). In particular, multiple modules may simultaneously be disposed on a planar press (in block 610) and have heat and pressure applied by the planar press (in block 620).

Figure 7:
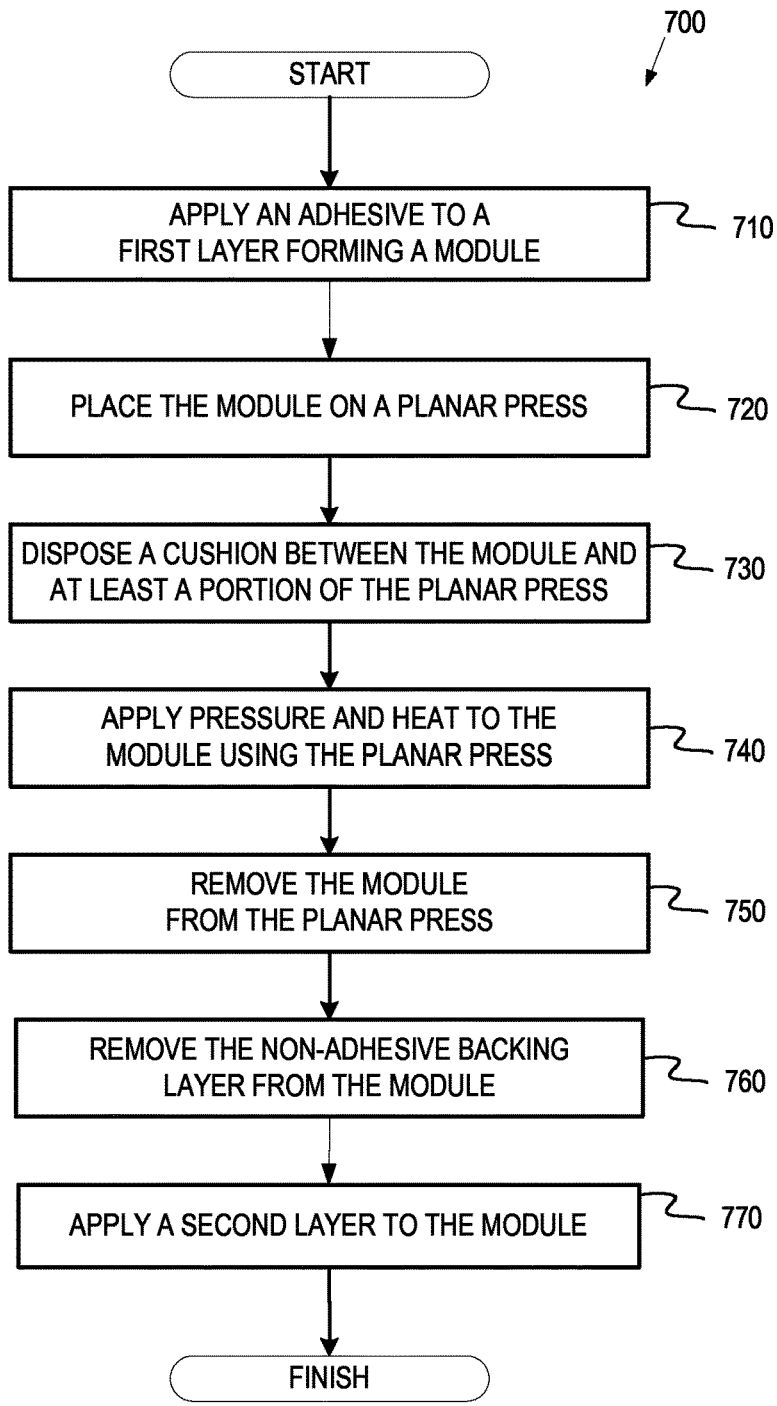
FIG. 7 illustrates a flowchart of an embodiment of a method of assuming a multi-layer module.

FIG. 7 illustrates a flowchart of an embodiment of a method 700 of assembling a multi-layer module module. The method 700 may be at least partially performed by processing logic that may include hardware (e.g., circuitry, dedicated logic, programmable logic, microcode, etc.), software (e.g., instructions executed by a processing device), firmware or a combination thereof. For example, the method 700 may be at least partially performed by the controller 550 of FIG. 5.

At block 710, a module is formed by applying an adhesive to a first layer. The adhesive may be applied using roll lamination such that module includes a non-adhesive backing layer. After application of the adhesive, the module includes an adhesive between the first layer and a non-adhesive backing layer. The adhesive may be a transparent adhesive. Examples of transparent adhesives that may be used include pressure sensitive adhesives, liquid dispensable adhesives, silicone optically clear adhesives, acrylate optically clear adhesives, or UV absorbing optically clear adhesives.

At block 720, the module is placed on a planar press. The planar press includes an upper plate and a lower plate. In one embodiment, the module is disposed on the lower plate such that the lower layer of the module rests upon the lower plate.

At block 730, a cushion is disposed between the module and at least a portion of the planar press. In one embodiment, the cushion is disposed between the non-adhesive backing layer of the module and the upper plate of the planar press. In one embodiment, the cushion is a rubber sheet approximately one millimeter thick.

At block 740, the planar press is activated and heat and directional pressure are applied to the module by the planar press. In one embodiment, the temperature is between approximately 30 and 70° C., the pressure is between approximately 0.10 and 0.30 MPa, and the heat and pressure are applied for between approximately two and ten minutes.

At block 750, the module is removed from the planar press. The cushion may also be removed and reused for other modules. In one embodiment, the cushion is attached to the module using an adhesive or gel. The adhesive and cushion may be removed from the module after planar pressing in a non-destructive manner. For example, the adhesive and cushion may be peeled off of the module, after which the module may be cleaned to remove any residual adhesive.

At block 760, the non-adhesive backing layer is removed, exposing the adhesive. At block 770, a second layer is applied to the exposed adhesive forming a two-layer module of a first layer and a second layer with adhesive disposed between the layers. The two-layer module may be subjected to further processing, such as decreased ambient pressure (e.g., in a vacuum lamination chamber), increased ambient pressure (e.g., in an autoclave), or directional pressure and heat (e.g., by a planar press).

Figure 8:
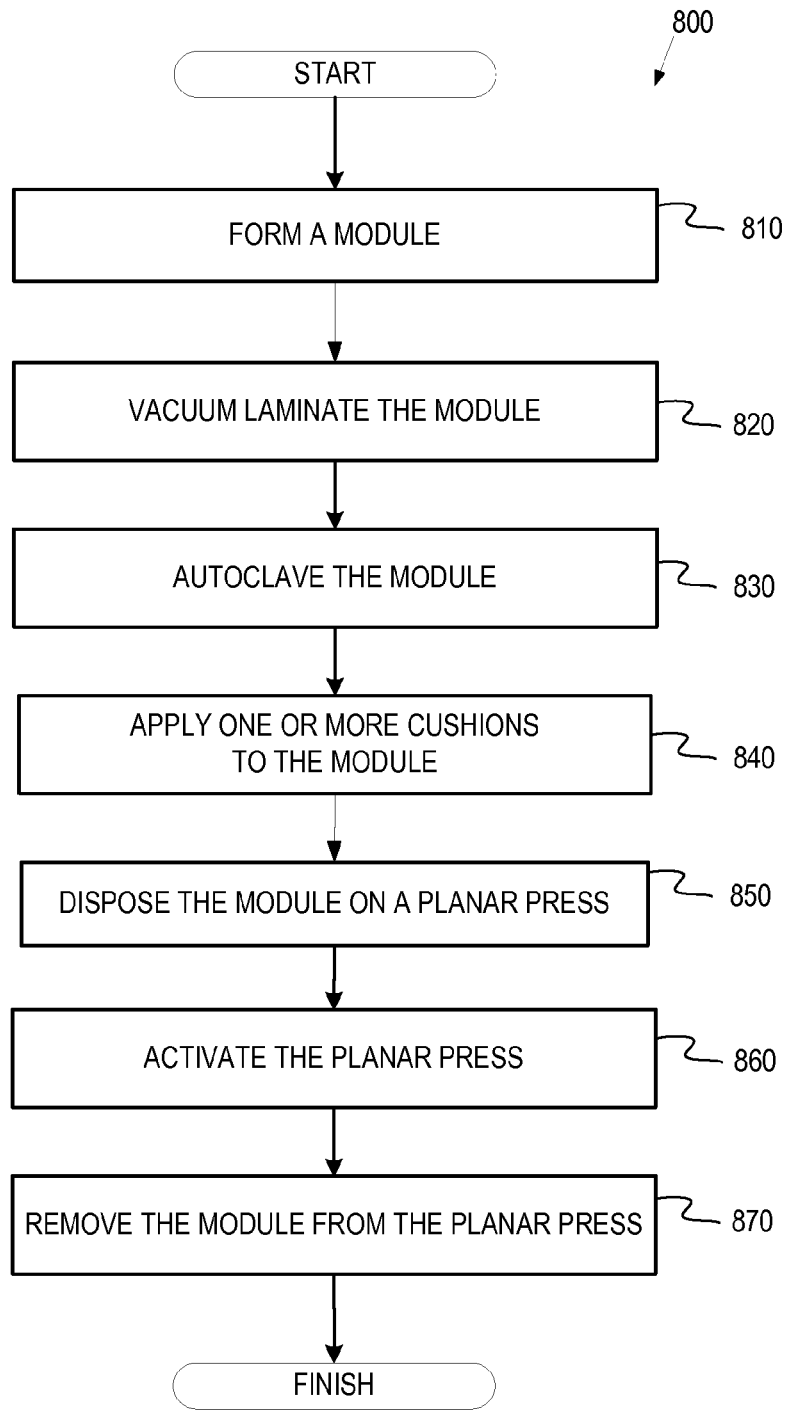
FIG. 8 illustrates a flowchart of another embodiment of a method of assembling a multi-layer module.

FIG. 8 illustrates a flowchart of another embodiment of a method 800 of assembling a multi-layer module. The method 800 may be at least partially performed by processing logic that may include hardware (e.g., circuitry, dedicated logic, programmable logic, microcode, etc.), software (e.g., instructions executed by a processing device), firmware or a combination thereof. For example, the method 800 may be at least partially performed by the controller 550 of FIG. 5.

At block 810, a module is formed. The module may be a single-layer module (such as the module 11 of FIG. 1A), a two-layer module (such as the module 12 of FIG. 1B), a three-layer module (such as the module 13 of FIG. 1C), or a module of any number of layers. In one embodiment, the module includes a base layer and an adhesive between the base layer and a non-adhesive backing layer. In another embodiment, the module includes an upper layer and a lower layer coupled together with an adhesive between the two layers. In another embodiment, the module includes more than two layers with adhesive between adjacent layers.

At block 820, the module is vacuum laminated. In particular, at block 820, the module is subjected to decreased ambient pressure. In one embodiment, the module is also subjected to heat during the vacuum lamination. The vacuum lamination may remove one or more defects of the module, such as a bubble, a delamination, or a non-uniformity of the adhesive. In one embodiment, the vacuum lamination bonds or improves the bond between an upper layer and a lower layer of a two-layer module.

At block 830, the module is autoclaved. In particular, at block 830, the module is subjected to increased ambient pressure. In one embodiment, the module is also subjected to heat during the autoclaving. The autoclaving may also remove one or more defects of the module, such as a bubble, delamination, or a non-uniformity of the adhesive.

At block 840, one or more cushions are applied to the module. In one embodiment, the cushions include framing cushions and applying the framing cushions includes removing the framing cushions from a protective backing that protects a low tack adhesive of the framing cushions and applying the framing cushions further includes attaching the framing cushions (using the low tack adhesive) to an edge or perimeter of the upper layer of the module and to an edge or perimeter of the lower layer of the module.

At block 850, the module and cushions are placed on a planar press. The planar press includes an upper plate and a lower plate. In one embodiment, the module is disposed on the lower plate such that the edge cushion applied to the lower layer of the module rests upon the lower plate.

At block 860, the planar press is activated and heat and directional pressure are applied to the module by the planar press. In one embodiment, the temperature is approximately 70° C., the pressure is approximately 0.10 MPa, and the heat and directional pressure are applied for approximately fifteen minutes.

At block 870, the module is removed from the planar press. The cushions are removed from the module and may be reused for other modules. The module may be subjected to further processing and included in a manufactured electronic device.

Although the blocks of the method 800 have been described in a particular order, the method 800 may be performed in that order or in any other order. For example, in one embodiment, the planar pressing of block 850-860 are performed after roll lamination, vacuum lamination, and autoclaving. In another embodiment, the planar pressing is performed before vacuum lamination and/or autoclaving.

Figure 9:
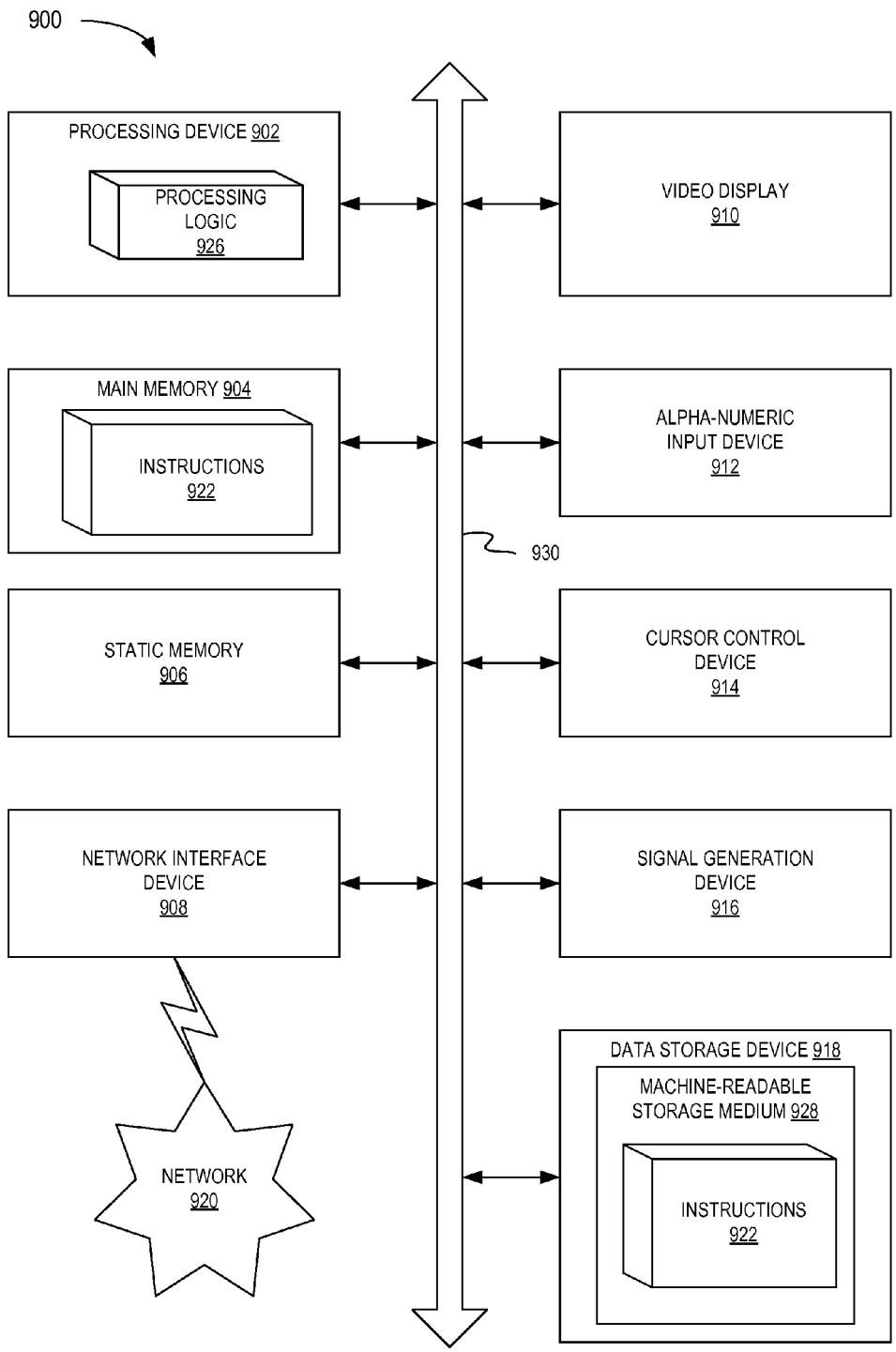
FIG. 9 illustrates a diagrammatic representation of a machine in the exemplary form of a computer system within which a set of instructions for causing the machine to perform any one or more of the methodologies discussed herein may be executed.

FIG. 9 illustrates a diagrammatic representation of a machine in the exemplary form of a computer system 900 within which a set of instructions, for causing the machine to perform any one or more of the methodologies discussed herein, may be executed. The machine may also represent an electronic device that includes a module that has been manufactured in accordance with embodiments described herein. The system 900 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, mobile phone, tablet computer, smart television, electronic reader, laptop computer, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 900 may represent (or at least include) the planar press 500 of FIG. 5.

The exemplary computer system 900 includes a processing device (processor) 902, a main memory 904 (e.g., read-only memory (ROM), flash memory, dynamic random access memory (DRAM) such as synchronous DRAM (SDRAM)), a static memory 906 (e.g., flash memory, static random access memory (SRAM)), and a data storage device 918, which communicate with each other via a bus 930.

Processing device 902 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 may also be one or more special-purpose processing devices such as an application specific integrated circuit (ASIC), a field programmable gate array (FPGA), a digital signal processor (DSP), network processor, or the like.

The computer system 900 may further include a network interface device 908. The computer system 900 also may include a video display unit 910 (e.g., a liquid crystal display (LCD), a light emitting diode (LED) display, en electronic ink (e-ink) display, etc.), an alphanumeric input device 912 (e.g., a keyboard), a cursor control device 914 (e.g., a mouse, touchpad, touchscreen, etc.), and a signal generation device 916 (e.g., a speaker).

The data storage device 918 may include a computer-readable medium 928 on which is stored one or more sets of instructions 922 (e.g., instructions to perform at least a portion of the method 700 of FIG. 7 or the method 800 of FIG. 8) embodying any one or more of the methodologies or functions described herein. The instructions 922 may also reside, completely or at least partially, within the main memory 904 and/or within processing logic 926 of the processing device 902 during execution thereof by the computer system 900, the main memory 904 and the processing device 902 also constituting computer-readable media. The instructions may further be transmitted or received over a network 920 via the network interface device 908.

While the computer-readable storage medium 928 is shown in an exemplary embodiment to be a single medium, the term "computer-readable storage medium" or "computer-readable medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "generating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   forming a display stack for an electronic device, the display stack comprising an upper layer, a middle layer, and a lower layer coupled together by a first optically clear adhesive disposed between the upper layer and the middle layer and a second optically clear adhesive disposed between the middle layer and the lower layer, wherein the upper layer comprises cover glass, the lower layer comprises a back plate, and the middle layer comprises at least one of a display layer or a touch sensor layer;
   attaching a first compressible cushion to four edges of an outer surface of the upper layer and a second compressible cushion to the four edges of an outer surface of the lower layer, wherein the first compressible cushion partially overlaps the four edges of the outer surface of the upper layer and the second compressible cushion partially overlaps the four edges of the outer surface of the lower layer;
   placing the display stack in a planar press;
   applying directional pressure and heat to the display stack for a first period of time to remove a first defect in the display stack, wherein the first cushion and the second cushion distribute the pressure to the four edges of the display stack;
   removing the first compressible cushion and the second compressible cushion from the display stack;
   subjecting the display stack to an ambient pressure of less than one atmosphere for a second period of time to remove a second defect in the display stack; and
   subjecting the display stack to an ambient pressure of greater than one atmosphere for a third period of time to remove a third defect in the display stack.

2. The method of claim 1, wherein a width of the first compressible cushion is between approximately five and ten percent of a width of the display stack.

3. The method of claim 1, wherein the first compressible cushion comprises compressible foam.

4. The method of claim 1, wherein forming the display stack comprises:
   roll laminating the first optically clear adhesive onto the lower layer, the first optically clear adhesive being coupled to a non-adhesive backing film;
   placing the lower layer in the planar press;
   applying directional pressure and heat to the lower layer for a fourth period of time to remove one or more defects in the first optically clear adhesive;
   removing the non-adhesive backing film from the first optically clear adhesive;
   applying a middle layer to the first optically clear adhesive;
   placing the lower layer and middle layer in the planar press; and
   applying directional pressure and heat to the lower layer and middle layer for a fifth period of time to remove one or more defects in the first optically clear adhesive.

5. A method comprising:
   attaching a compressible cushion to at least a portion of an outer surface of a module, the module comprising a first layer and a second layer bonded by an optically clear adhesive between the first layer and the second layer;
   placing the module in a planar press, such that the compressible cushion is disposed between the module and at least a portion of the planar press;
   applying directional pressure and heat to the module via the compressible cushion for a first period of time; and
   removing one or more defects in the module associated with the optically clear adhesive, wherein removing the one or more defects comprises at least one of:
      removing a bubble disposed in the optically clear adhesive; or
      reducing non-uniformity of the optically clear adhesive.

6. The method of claim 5, wherein the first layer comprises a non-adhesive backing film and the second layer comprises at least one of a back plate, a display layer, a touch sensing layer, or cover glass.

7. The method of claim 5, wherein the first layer comprises a first one of a back plate, a display layer, a touch sensing layer, or cover glass and the second layer comprises a second one of the back plate, the display layer, the touch sensing layer, or the cover glass.

8. The method of claim 5, wherein the compressible cushion comprises at least one of a rubber sheet or a compressible foam layer.

9. The method of claim 5, wherein the compressible cushion comprises at least one framing cushion disposed at four edges of the module.

10. The method of claim 5, further comprising subjecting the module to an ambient pressure of less than or greater than one atmosphere.

11. The method of claim 10, wherein subjecting the module to the ambient pressure of less than or greater than one atmosphere is performed before placing the module in the planar press.

12. The method of claim 10, wherein subjecting the module to the ambient pressure of less than or greater than one atmosphere is performed after removing the module from the planar press.

13. The method of claim 9, wherein the directional pressure is between approximately 0.05 and 0.30 megapascals.

14. The method of claim 9, wherein the heat is between approximately 30 and 80 degrees Celsius.

15. The method of claim 9, wherein the first period of time is between approximately two and fifteen minutes.

16. A method comprising:
   forming a display stack for an electronic device, the display stack comprising an upper layer, a middle layer, and a lower layer coupled together by optically clear adhesive;
   attaching a first compressible cushion to four edges of an outer surface of the upper layer and a second compressible cushion to four edges of an outer surface of the lower layer;
   placing the display stack in a planar press;
   applying directional pressure and heat to the display stack via the first compressible cushion and the second compressible cushion for a first period of time to remove a first defect in the display stack, wherein the first compressible cushion and the second compressible cushion distribute the pressure to the four edges of the display stack; and removing the first cushion and the second cushion from the display stack.

17. The method of claim 16, wherein a width of the first cushion is between approximately five and ten percent of a width of the display stack.

18. The method of claim 16, wherein the first compressible cushion comprises compressible foam.

19. The method of claim 16, wherein removing the first defect comprises at least one of removing a bubble disposed in the optically clear adhesive or reducing non-uniformity of the optically clear adhesive.

* * * * *